Oct. 31, 1950  V. E. HAUTA  2,528,362
AXIALLY SHIFTING TYPE TIRE REMOVING DEVICE
Filed Nov. 7, 1949  2 Sheets-Sheet 1

Inventor
Verner E. Hauta

By Clarence A. O'Brien
and Harvey B. Jacobson
Attorneys

Oct. 31, 1950 V. E. HAUTA 2,528,362
AXIALLY SHIFTING TYPE TIRE REMOVING DEVICE
Filed Nov. 7, 1949 2 Sheets-Sheet 2
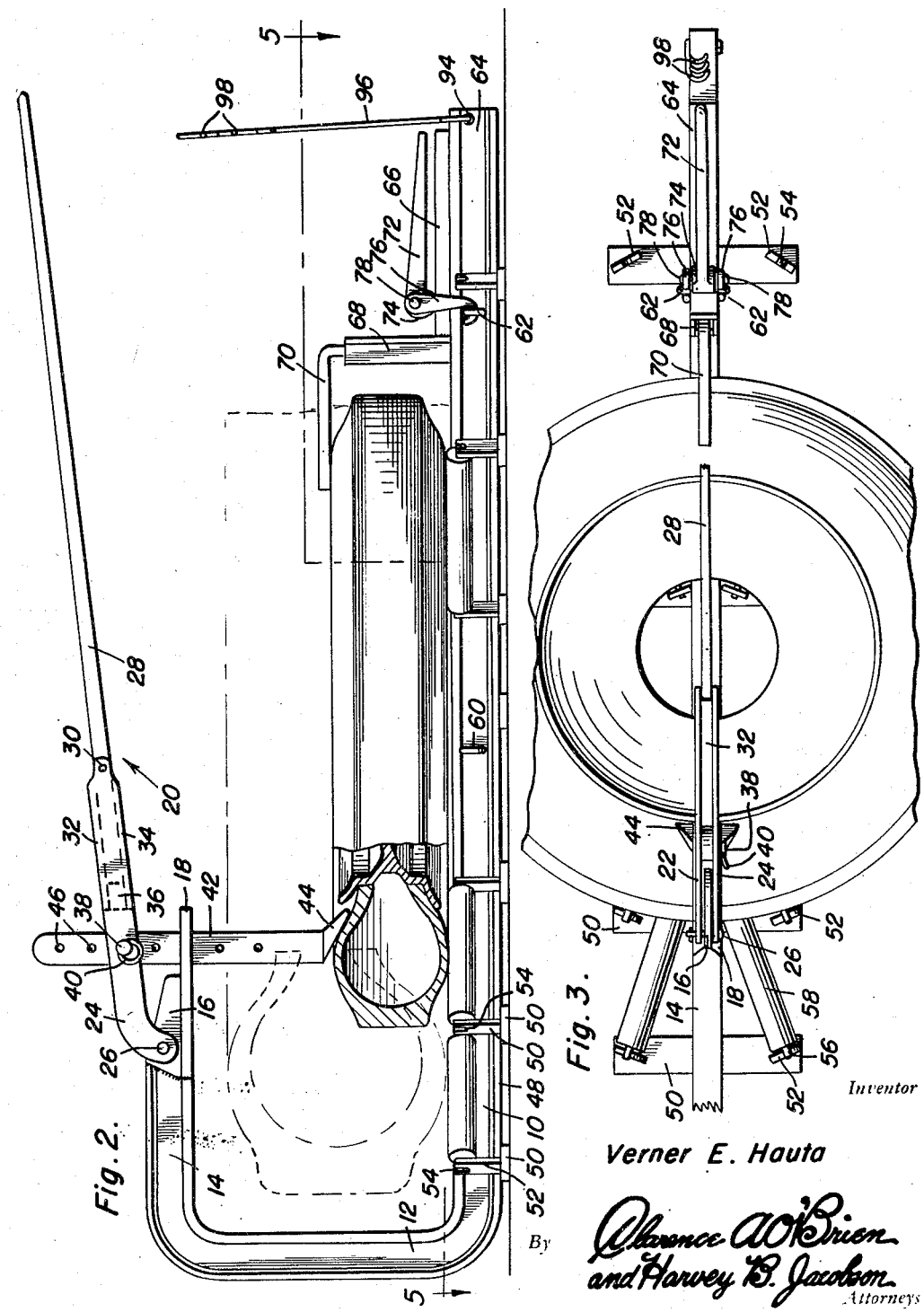
Inventor
Verner E. Hauta

Patented Oct. 31, 1950

2,528,362

UNITED STATES PATENT OFFICE 2,528,362

AXIALLY SHIFTING TYPE TIRE REMOVING DEVICE

Verner E. Hauta, Bessemer, Mich.

Application November 7, 1949, Serial No. 125,947

8 Claims. (Cl. 157—1.17)

This invention relates to tire tools, and more particularly to a device adapted to remove tires from tractor or truck wheels.

Tires which have been mounted on the rim of a wheel for a substantial length of time will adhere to the rim so as to make it very difficult to release the tire from the rim, since the rims of the wheels are usually made from steel and there is a tendency for the adjacent metal to rust and form a bond between the tire bead and the rim.

An object of this invention is to provide a device which is especially adaptable for removing tires from what is commonly known as "drop center" rims on which pneumatic tires are used, while being equally adaptable for rims having lock rings.

A further object of the invention is to provide a tire tool which is equally adaptable for removing tires from wheel rims on which the tires are mounted. These tires may be of solid rubber or pneumatic.

It is also an object of the device, when in use on a pneumatic tire where the rusting of the metal forms a bond which must be broken before the tire can be removed, to remove the tire without destroying the tire and tube.

Yet another object of the invention is to provide a tire tool which is adjustable for removing various size tires from rims while providing a desired leverage for tires of greater size.

Still another object of the invention is to provide a novel device for maintaining the wheel on which the tire to be removed is in place in a relatively rigid position.

A further object of the invention is to provide means for more readily rotating a tire on a wheel about the base of the tire tool so that the tire-engaging member may be more easily capable of performing its several and continuous operations on the tire.

Still further objects reside in the provision of a tire tool that is simple in construction, strong, durable, and convenient in operation, easy to manufacture, and relatively inexpensive.

These, together with the various ancillary objects of the invention which will become apparent as the following description proceeds, are attained by this tire tool, a preferred embodiment of which has been illustrated in the accompanying drawings, wherein:

Figure 2 is a side elevational view of the tire tool in an enlarged scale showing the tire tool in operative engagement with the tire on a wheel of a vehicle, the wheel being shown in cross-section for the greater detail thereof;

Figure 3 is a partial top plan view of the embodiment shown in Figure 2;

Figure 1:
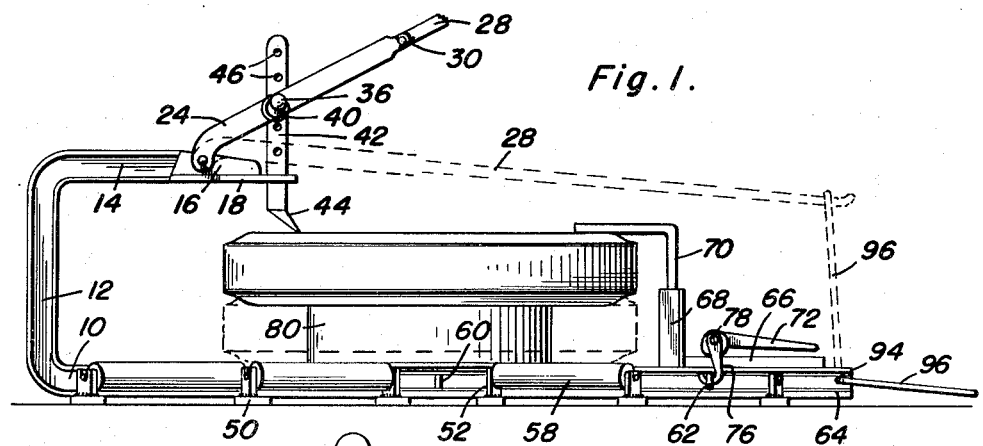
Figure 1 is a side elevational view of the tire tool comprising the present invention showing it in one stage of the operation thereof.

With continued reference to the accompanying drawings wherein like reference numerals designate similar parts throughout the various views, 10 generally represents an elongated base formed from an I beam which has a standard 12 and an arm 14 formed integrally therewith.

Formed at one end of the arm 14 is a plate 16 and a guide 18. A lever generally designated by reference numeral 20 is provided and is formed from a pair of spaced members 22 and 24 which are positioned on either side of the plate 16. These spaced members 22 and 24 are suitably shaped and pinned as at 26 for a pivotal mounting relative to the arm 14. A lever bar 28 is pinned as at 30 to the other end of the spaced members 22 and 24, and a socket is formed by the top and bottom pieces 32 and 34, and the center piece 36 which are welded or otherwise secured to the spaced plates.

A readily removable pin 38 having a pull ring 40 is used to pivotally mount a tire-engaging member 42 between the spaced members 22 and 24. The tire-engaging member 42 extends through the guide 18 and is formed with a spoon 44 for insertion under the rim of the tire. This tire-engaging member has a plurality of apertures 46 therethrough for selective adjustment of the member 42 for different size tires.

Secured to the base 10 by welding to the bottom flange 48 of the I beam from which the base is made are a plurality of brackets having base plates 50 and angularly disposed upright plates 52 having notches 54 for reception of shaft ends 56 of rollers 58 which are mounted between two spaced brackets. On either side of the base 10 extend eyes 60. Likewise, another pair of eyes 62 are secured adjacent the end 64 of the base.

A slide 66 is placed upon the base 10. Welded to an end of the slide 66 is a tube 68 which is preferably of square shape. An L-shaped member is slidably emplaced in the tube 68. A clamp comprising a bar 72 having a cylinder 74 secured at one end is provided with a pair of hooks 76 which are pinned as at 78 eccentrically dislocated from the center of the cylinder 74. The hooks are positioned within the eyes 62, and upon suitable rotation of the bar 72, the slide 66 may be substantially rigidly clamped to the base 10.

This tire tool is used to break the bead of the tire by forcing the bead downwards off the rim or wheel, as best shown in Figure 1. The wheel with the tire thereon is placed upon a jig 80 which has been previously placed upon base 10. Then the spoon 44 of the tire-engaging member 42 is positioned on the side wall of the tire so that upon depression of the lever 28, the spoon will force the bead of the tire downwards off the rim onto jig 80. The entire wheel and jig can be quite easily rotated to another position for engagement by the spoon 44 due to the rolling engagement by rollers 58.

Figure 6:
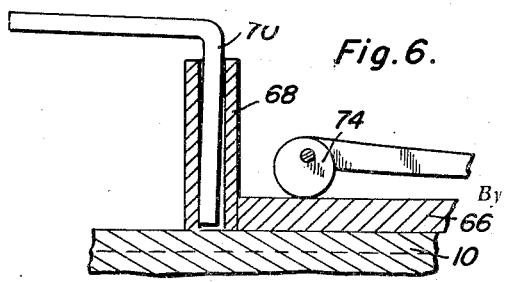
Figure 6 is a vertical sectional view as taken along line 6—6 in Figure 5.

Referring now more particularly to Figure 6, it will be seen that the L-shaped member 70 is used to rigidly hold the tire against vertical movement when the lever 28 is depressed in the operation shown in Figure 1. Since the tire will press upright against the extending end of the L-shaped member 70, a frictional engagement between the member 70 and the tube 68 will prevent the raising of the member 70 out of the central aperture in the tube 68.

The tire tool is equally adaptable to break the bead of small or large tractor tires from the rusted rims by forcing the bead to the drop center of the rim. This operation is best shown in Figure 2. The wheel is placed on base 10. Then spoon 44 of the tire engaging member 42 is positioned on the side wall of the tire so that upon depression of the lever 28 the spoon will force the bead of the tire into the drop center of the rim. The wheel is then turned over and the spoon is actuated to break the other bead so that both beads will be in the drop center of the rim. The tire will then be easily removed by hand irons commonly used in tipping one side of the tire over the edge of the rim. The entire wheel, as in Figure 2, may be quite easily rotated to another position for engagement with spoon 44 by rolling engagement on rollers 58. However, as desired, these rollers may be raised out of notches 54 in plates 52. In a like manner, the smaller tires of automobiles may be removed from their drop center rims.

This tire tool can be readily used in spreading tires apart for ready removal of a tube which is heat bonded or otherwise secured to the inner surface of the tire. As shown best in Figure 4, a clip formed from a pair of substantially S-shaped portions 82 and 84 and a central connecting portion 86 is positioned so as to encompass the tire-engaging member 42 while resting on the spoon 44. The lower portions of the clip form hooks which, when the lever 28 is raised, will pull upon the side wall of the tire. A clamp member generally designated by reference numeral 88 is used to hold a tire-engaging tool 90 rigidly to the base 10. This tire-engaging tool 90 is provided with a hook portion 92 which will retain the other side wall of the tire in a position against the base 10. Thus, the tire may be easily spread apart. The clamp 88 is of similar design to the clamp used in holding the slide 66 in place. Actually, during the subsequent operations of the device, the original clamp used to hold the slide in place may be moved forward for engagement with the eye 60 instead of the eye 62. The end of the base 10 is provided with an aperture 94 through which a lever lock 96 may be secured. The lever lock 96 is provided with a plurality of spaced hooks 98 for selective engagement with the lever 28 so as to hold it in place while applying pressure upon the tire.

Figures 4, 7:
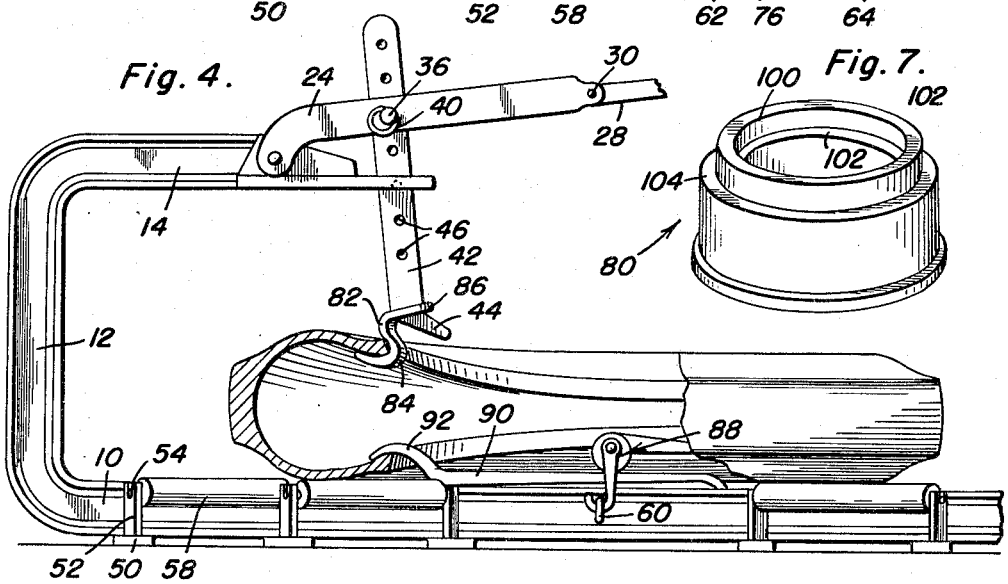
Figure 4 is a side elevational view showing the tool in performing a second and different operation.
Figure 7 is a perspective view of an element of the invention.
Figure 5:
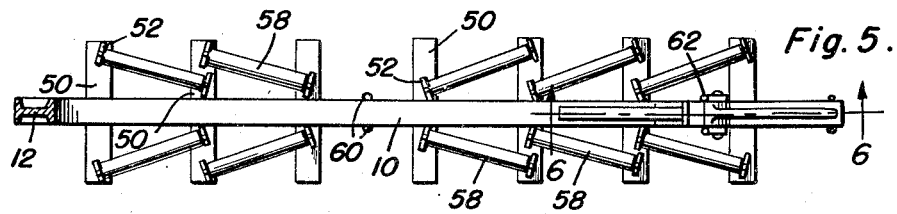
Figure 5 is a vertical sectional view as taken along line 5—5 in Figure 2.

Referring now to Figure 7, it will be seen that the jig 80 is formed with an annular integral upper ring 100 which forms an inner shoulder 102 and an outer shoulder 104. The shoulders are provided so as to enable an additional separate ring to be positioned in engagement therewith to add height to the jig 80 if needed.

Since, from the foregoing, the construction and advantages of this tire tool are readily apparent, further description is believed to be unnecessary.

However, since numerous modifications will readily occur to those skilled in the art after a consideration of the foregoing specification and accompanying drawings, it is not intended to limit the invention to the precise embodiment of the tire tool shown and described, but all suitable modifications and equivalents may be resorted to which fall within the scope of the appended claims.

Having described the invention, what is claimed as new is:

1. A tire tool comprising an elongated base, a standard secured to said base at one end thereof, an arm rigidly secured to said standard and extending perpendicularly thereto, a lever pivotally secured to said arm, a tire-engaging member pivotally secured to said lever, a plurality of spaced brackets secured to said base, and a plurality of rollers mounted in said brackets.

2. A tire tool comprising an elongated base, a standard secured to said base at one end thereof, an arm rigidly secured to said standard and extending perpendicularly thereto, a lever pivotally secured to said arm, a tire-engaging member pivotally secured to said lever, a plurality of spaced brackets secured to said base, each of said brackets having a notch therein, and a plurality of rollers pivotally mounted in said notches in said brackets.

3. A tire tool comprising an elongated base, a standard secured to said base at one end thereof, an arm rigidly secured to said standard and extending perpendicularly thereto, a lever pivotally secured to said arm, a tire-engaging member pivotally secured to said lever, a plurality of spaced brackets secured to said base, a plurality of rollers mounted in said brackets, and means on said base adapted to hold a tire stationary and a clamp secured to said base adapted to adjustably hold said means on said base.

4. The structure of claim 3 wherein said clamp comprises a bar, a cylinder secured to one end of said bar, and a pair of hooks each pivotally secured to an end of said cylinder at a point eccentrically dislocated from the center of said cylinder, said hooks engaging eyes secured to said base.

5. A tire tool comprising an elongated base, a standard secured to said base at one end thereof, an arm rigidly secured to said standard and extending perpendicularly thereto, a lever pivotally secured to said arm, a tire-engaging member pivotally secured to said lever, and means on said base adapted to hold a tire stationary, and a clamp secured to said base adapted to adjustably hold said means on said base, said clamp comprising a bar, a cylinder secured to one end of said bar, and a pair of hooks each pivotally secured to an end of said cylinder at a point eccentrically dislocated from the center of said cylinder, said hooks engaging eyes secured to said base.

6. The structure of claim 5 including a plurality of spaced brackets secured to said base, each of said brackets having a notch therein, and a plurality of rollers pivotally mounted in said notches in said brackets.

7. The structure of claim 6 wherein said means comprise a slide horizontally positioned on said base, a tube secured to one end of said slide, and an L-shaped member slidably positioned in said tube, said cylinder being adapted to engage said slide.

8. The structure of claim 7 wherein said lever comprises a pair of spaced members, said arm and said tire-engaging member being pivotally secured to said lever between said spaced members.

VERNER E. HAUTA.

REFERENCES CITED

The following references are of record in the file of this patent:

UNITED STATES PATENTS

| Number | Name | Date |
| --- | --- | --- |
| 1,742,590 | Freivogel | Jan. 7, 1930 |
| 2,433,113 | Graves | Dec. 23, 1947 |
| 2,478,214 | Turner | Aug. 9, 1949 |